No. 751,887. PATENTED FEB. 9, 1904.
M. K. WESTCOTT.
APPARATUS FOR TREATING FODDER PREPARATORY TO COMPRESSING SAME.
APPLICATION FILED APR. 20, 1903.
NO MODEL.
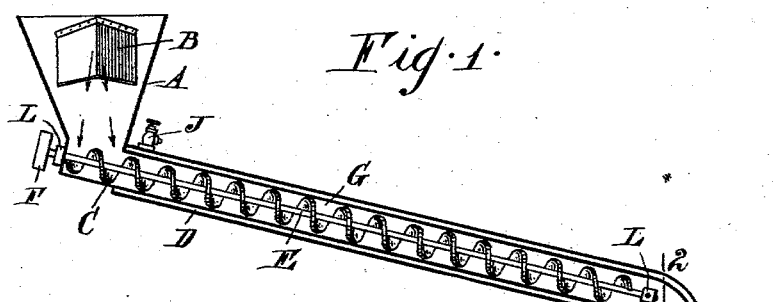
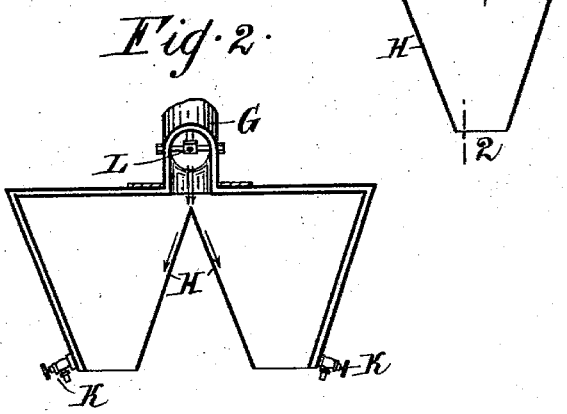
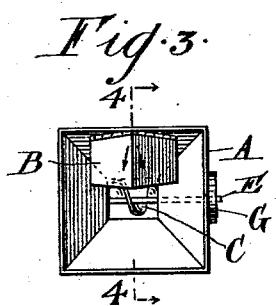
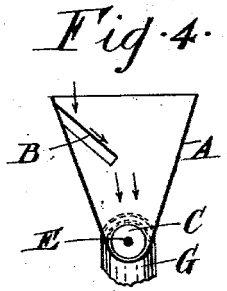
Witnesses
Walter C. Hart
Edwin Wilson
Inventor
Mark Knight Westcott
by
Edw Waters & Son
Attorneys No. 751,887. Patented February 9, 1904.

UNITED STATES PATENT OFFICE.

MARK KNIGHT WESTCOTT, OF CAMBERWELL, VICTORIA, AUSTRALIA.

APPARATUS FOR TREATING FODDER PREPARATORY TO COMPRESSING SAME.

SPECIFICATION forming part of Letters Patent No. 751,887, dated February 9, 1904.

Application filed April 20, 1903. Serial No. 153,531. (No model.)

*To all whom it may concern:*

Be it known that I, MARK KNIGHT WESTCOTT, a subject of the King of Great Britain, residing at "Kaiwa," Moorhouse street, Camberwell, near Melbourne, in the State of Victoria and Commonwealth of Australia, have invented Improved Apparatus for Treating Fodder Preparatory to Compressing Same, of which the following is a specification.

This invention has been devised for the purpose of providing an improved apparatus for rapidly and effectively heating and mixing chaff, bran, crushed corn, or other fodder or mixture of fodders in order that they may be readily compressed into convenient blocks for transport, which blocks will retain their nutritious qualities unimpaired for a considerable length of time and, furthermore, be proof against ordinary dampness and atmospheric changes.

Referring to the drawings, Figure 1 is a central vertical section of an improved apparatus for carrying out said treatment; Fig. 2, a transverse section on line 2 2, Fig. 1; Fig. 3, a plan of the hopper and spreader; and Fig. 4, a vertical section on line 4 4, Fig. 3.

A represents a tapering hopper or feed-box situate at the head of an inclined cylindrical pipe or chute and having an angular spreader B riveted to one side and which serves to deliver the material in a thin stream or particles onto the upper end of a screw conveyer or worm C, mounted axially within said pipe and cased with a steam-jacket D. The worm C is mounted on a shaft E, driven from a pulley F, and the material is fed onto the spreader B at such a rate as to cause the separate particles to fall onto the head of the worm C, by which it is conveyed in a thin stream through a steam-jacketed chute G and discharged onto a receiving-hopper H, divided midway by an angular deflector-guide, the material being thus supplied equally to two presses, which is the number found most convenient for general use.

The steam-jacket D is supplied with steam at a temperature of from 155° to 175° Fahrenheit through inlet-valve J, and said jacket communicates with the jacket of the hopper H, at the bottom of which is an outlet-valve K, so that the circulation of the steam in the jackets may be controlled.

L represents bearings for the shaft E, and the whole apparatus is supported by beams or other convenient framing above the presses, which are situated directly under the divided hopper H to receive the material after treatment in the manner above mentioned.

With this invention the temperature is uniform and maintained economically, and the flakes or particles of the material are thoroughly, separately, and equally heated and agitated before reaching the press.

Having now particularly described and ascertained the nature of my said invention and in what manner the same is to be performed, I declare that what I claim is—

1. In an apparatus for treating fodder, the combination of an inclined steam-jacketed pipe, a feed-hopper for delivering material into the entering end of the pipe, an angular spreader on a side wall of said hopper onto which material is initially delivered, which serves to form the material into a thin stream prior to its entrance into the pipe, a feed device in the pipe for advancing the material along the same in a thin stream, and a steam-jacketed hopper for receiving the material from the delivery end of the pipe, the steam-jacket of the last-mentioned hopper being a continuation of the jacket around said pipe.

2. In an apparatus for treating fodder, the combination of an inclined steam-jacketed pipe, a feed-hopper at the entering end of the pipe arranged to deliver material into the upper end of said pipe, an angular spreader supported by a side wall of the hopper within the same and onto which the material is initially delivered, said spreader serving to form the material in the hopper into a thin stream prior to its entrance into said pipe, a rotative screw extending the complete length of the pipe and adapted to advance the material along said pipe in a thin stream, and a two-part steam-jacketed hopper for receiving the material for the delivery end of the pipe, the steam-jacket of the last-mentioned hopper being a continuation of the jacket around said pipe.

In testimony whereof I have hereunto set my hand in presence of two subscribing witnesses.

MARK KNIGHT WESTCOTT.

Witnesses:
EDWARD WATERS,
EDWARD WATERS, Junr.